ARTHUR R. BRADY
NEAL B. ROTHFUSS
INVENTORS

BY Robert A. Benziger

ARTHUR R. BRADY
NEAL B. ROTHFUSS
INVENTORS

United States Patent Office 3,543,537
Patented Dec. 1, 1970

3,543,537
SYNCHRONIZING COUPLING
Neal B. Rothfuss, Clinton, and Arthur R. Brady, Utica, N.Y., assignors to The Bendix Corporation, a corporation of Delaware
Filed Nov. 20, 1968, Ser. No. 777,424
Int. Cl. F16d *3/52, 3/79*
U.S. Cl. 64—13                                   8 Claims

ABSTRACT OF THE DISCLOSURE

A flexible coupling for shafts having intersecting non-colinear axes and which need not execute full rotational movement. The coupling comprises a plurality of flexible diaphragms which are connected to cylindrical segments having purposely non-parallel end planes. Since diaphragm couplings are rotationally rigid, but are axially-elastically-deformable, they permit synchronized rotary movement between coupled shafts.

SUMMARY OF THE INVENTION

In the aircraft industry, a need has developed in recent years for a reliable, light-weight, shaft coupling to be used in controlling the movement of aircraft control surfaces such as ailerons, rudders, elevators, and the like, and also in controlling the air inlet and exhaust of jet engines. It is, therefore, an object of this invention to provide a shaft coupling which is light in weight and reliable. Since there are in existence various techniques for controlling the above-noted aircraft control parameters, it is a further object of this invention to provide a shaft coupling which is highly reliable, lower in weight, and lower in cost than existing shaft couplings for comparable use.

In control of the various control surfaces and parameters, various functional requirements are presented by today's aircraft and those aircraft proposed for the future. The temperature range within which such a coupling must operate is usually quite broad with a low temperature in the range of —100° F. and a high of about 600° F. Furthermore, as the speeds of aircraft increase, the amount of force necessary to move and hold the various control surfaces necessitates high torque loading on the control shafts. It is, therefore, an object of this invention to provide a shaft coupling capable of withstanding large variations in environmental conditions. It is also an object of this invention to provide a shaft coupling capable of transmitting large amounts of torque. It is also an object of the present invention to provide shaft couplings capable of satisfying all of the above-enumerated objectives which have low maintenance requirements.

Prior art couplings are known which are capable of providing transfer of control commands between axially non-aligned shafts. The requirements of such a transfer present two interrelated problems which these prior art couplings were able to solve, only by involved, indirect, and expensive means, if at all. These problems are (1) the inter-shaft transfer of a control command in perfect synchronization without lost motion and (2) the elimination of backlash. It is, therefore, an object of the present invention to provide an inter-shaft coupling for transmitting control commands between axially non-aligned shafts having perfect synchronization of angular rotation and having no backlash. It is a further objective of this invention to provide such a coupling which is lighter in weight and lower in cost than known synchronizing couplings. Prior art couplings also required periodic maintenance which contributed to aircraft down-time so it becomes a still further object of this invention to provide a synchronized coupling which is maintenance-free. The last mentioned objective is readily accomplished provided the coupling is friction-free and does not require periodic calibration so that it is an object of this invention to provide a synchronizing coupling having no rubbing surfaces and requiring no calibration.

In the operation of the control surfaces by the rotation of the control shafts, rotational rigidity is, of course, mandatory, but due to possible variation in shaft length and spacing between shaft ends, there must be an element of axial flexibility in the couplings to enable them to interconnect shafts having the maximum displacement of their adjoining ends as well as to accommodate spacing variations experienced in use. It is, therefore, a still further object of the present invention to provide a shaft coupling which is rotationally-rigid and axially flexible.

It is known that flexural couplings can couple power transmitting shafts when there exists a slight degree of misalignment. It is also known that the flexural elements of these couplings possess many of the desirable characteristics mentioned above. However, the control surface control shafts for which efficient couplings are needed have a significant difference which makes the known flexible diaphragm-type couplings particularly inapplicable. This is the fact that these control shafts have relatively large angular non-alignments as contrasted with the slight misalignment of supposedly aligned shafts for which the known diaphragm couplings are capable of compensating. These prior art couplings are then incapable of coupling shafts having an intentional non-alignment. It is, therefore, a still further object of this invention to provide a new type of flexible diaphragm coupling for transmitting rotational energy between angularly offset shafts.

In the usage of shafts in controlling aircraft control surfaces and parameters, it is often the case that shaft rotation is kept less than 180°. It is, therefore, an object of the present invention to provide a shaft coupling for axially non-aligned shafts which are required to rotate less than 180°. In this situation, the shafts are often required to rotate about a null or some other desired fixed neutral point so it, therefore, becomes a still further object of the present invention to provide a flexible diaphragm coupling for shafts which are required to rotate no more than a fixed amount of degrees, clockwise and counter-clockwise, about a fixed neutral or null position.

The man skilled in the art will recognize other objects and advantages from the appended claims and drawing wherein:

DETAILED DESCRIPTION OF THE DRAWING

Figure 1:
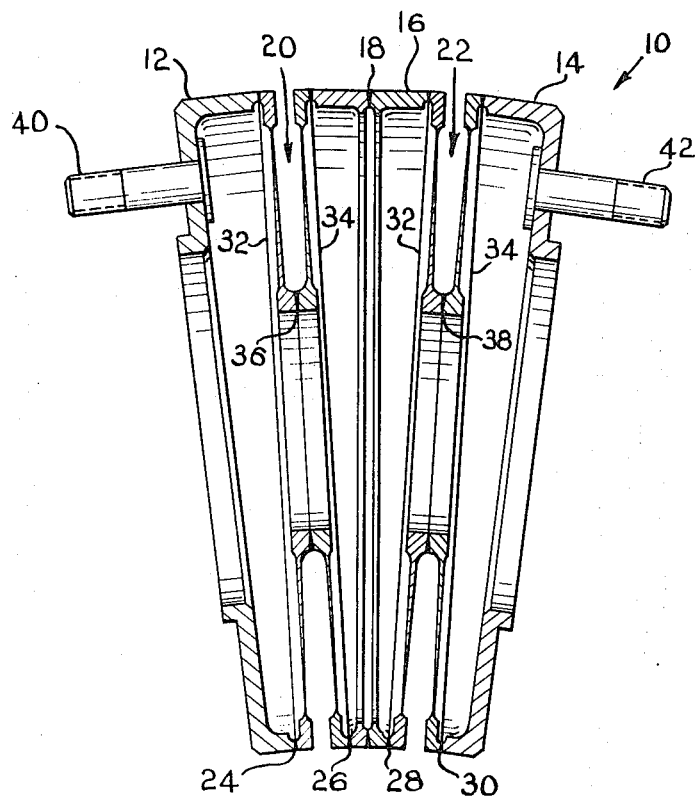
FIG. 1 shows a preferred embodiment of the invention in a section view.

Referring now to FIG. 1, a coupling according to the present invention is shown and designated generally by 10. The coupling consists of first and second coupling mounting members 12 and 14, flexural means in the form of diaphragm groupings 20 and 22, and intermediate housing member 16. The intermediate housing member 16 is shown here as two elements welded together at 18. Interconnecting the mounting members 12 and 14 and the intermediate member 16 are diaphragm groupings indicated generally as 20 and 22 which are attached, at their respective circumferences, to the free ends of their respective mounting members and to the housing member by conventional means, shown here as welding as at 24, 26, 28, and 30. In this embodiment, the diaphragm groupings 20 and 22 are comprised of a pair of adjacent flexible diaphragm members 32 and 34 which are interconnected by conventional means at a circumferential zone radially opposed to, or radially-inward from, their zones of attachment to the mounting member and to the intermediate member, shown here as welding as at 36 and 38. The mounting members 12 and 14 are adapted to be attached to adjacent shafts to be coupled by any suitable and conventional means which are shown here as threaded bolts 40 and 42.

Figure 2:
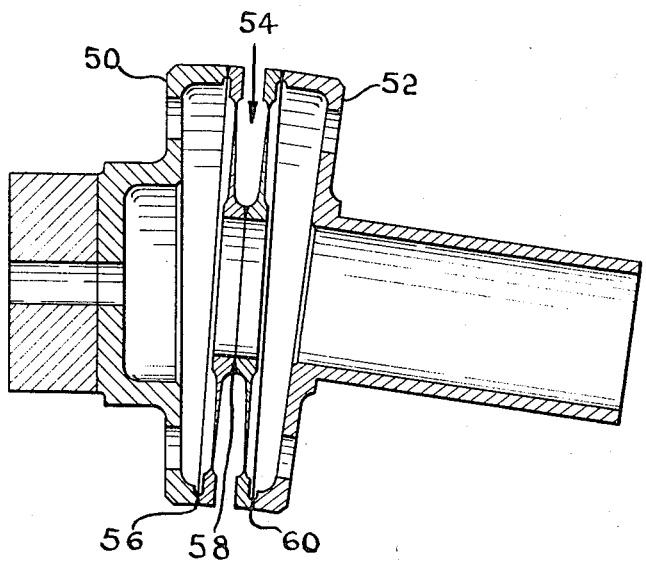
FIG. 2 shows another embodiment of the invention again in a section view.

FIG. 2 shows a second embodiment of my invention wherein the mounting members 50 and 52 are directly coupled to each other by a single diaphragm grouping 54. All the components are again interconnected by conventional means as by welding as shown at 56, 58, and 60. The coupling of this embodiment is best used when the angular non-alignment of the shafts to be coupled is on the order of one-half the angular non-alignment of shafts for which the FIG. 1 embodiment is used.

Figure 3:
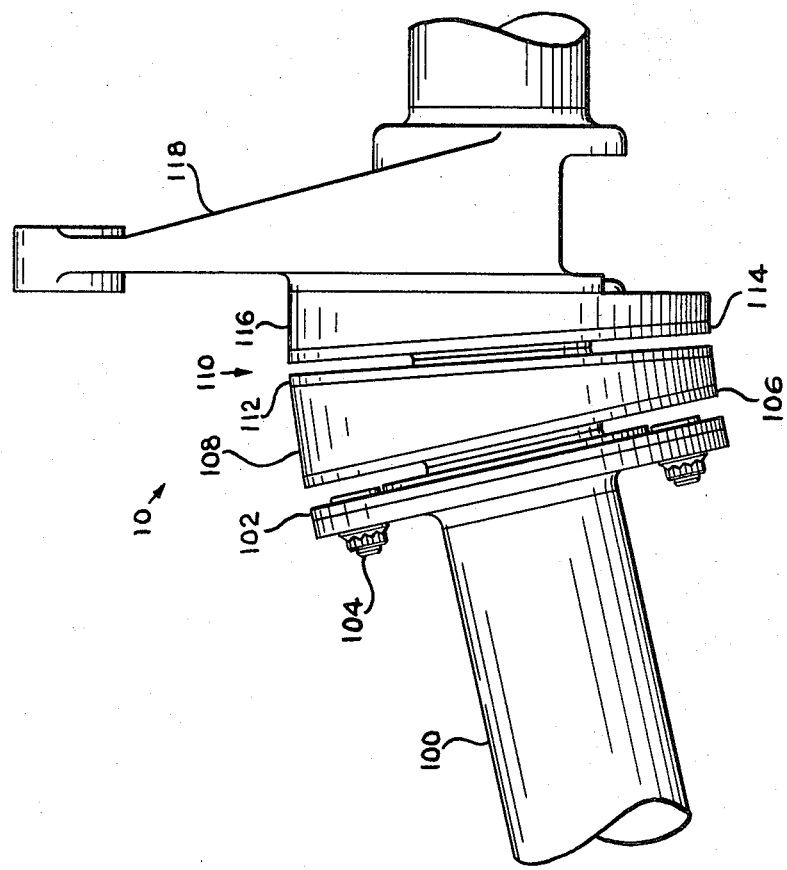
FIG. 3 shows one adaptation of the invention to control the air inlet by-pass gates of a jet engine.

FIG. 3 shows still a third embodiment of my invention as it might be applied to control the air inlet by-pass doors of a turbine engine. The coupling itself is similar to that shown in FIG. 1 and described above except that one diaphragm grouping contains a single diaphragm in place of one of the pairs of diaphragms. In this FIG. 3 embodiment, a shaft 100 is coupled to a coupling mounting member 102 by conventional means such as by bolts 104 along a radially-removed circumferential region on the member 102. Along a circumferential region radially-inward from the bolt circle, the member 102 is welded to the single diaphragm 106 which is welded at its periphery to the intermediate housing member 108. The intermediate housing member is welded at its other end to the periphery of one of the diaphragms 112 in a multiple-diaphragm grouping 110 with the periphery of a second diaphragm 114 welded to the other coupling mounting member 116.

A door-operating arm 118 is fixedly attached to the mounting member 116 by known means, for rotary movement therewith. This arm 118 could also be the power input mechanism whereby rotary motion of the shafts 100 and couplings 10 is caused by an angular displacement of the arm 118.

As can be seen from the various figures, the couplings each have a different number of diaphragm members and a different number of housing members, but in each case the individual housing members and diaphragm members are similar. The various housing members have at least one end-plane which is non-parallel to the plane of rotation of the housing member. That is, at least one end-plane of the various housings is intentionally non-parallel to the planes which are perpendicular to the centerlines of the particular housing. This gives the housing members, in profile, the shape of a truncated triangle. This shape, in varying degrees, controlled by the angle of the truncated apex and the total number of members, permits the coupling to interconnect non-coaxial, or skew shafts whenever these shafts operate over a degree range of rotation of less than 180°.

The interconnecting diaphragms are rotationally-rigid so that the coupling will transmit the same amount of rotation to a shaft on one side of the coupling as was executed by the shaft on the other side of the coupling. This rotation will be perfectly synchronized without lag or backlash. As is well known, these diaphragms are quite flexible in the axial direction so that while executing rotary motion, the diaphragms in the coupling can easily be axially deformed while the coupling is transmitting rotary motion, thereby allowing smooth operation. It should also be apparent that these couplings have no rubbing surfaces and, therefore, do not require lubrication, seals, or periodic maintenance and because the couplings are rotationally rigid, periodic calibration is no longer necessary. Since many of the control parameters of an aircraft do not require full 360° control shaft rotation, the operation of the coupling will not be hindered or impeded by the non-parallel orientation of the housing end planes which permits the "around-the-corner" operation of the coupling.

We claim:
1. A coupling for interconnecting non-coaxially aligned shafts and for sychronizing movement therebetween comprising:
   a pair of mounting members, each adapted at one end for attachment to the ends of the shafts to be coupled;
   at least one of said mounting members having a free-end plane non-parallel to the rotational plane of said mounting member;
   a first flexural member attached along a first circumferential zone to the free-end of one of said pair of mounting members;
   interconnecting means operative to interconnect the other of said mounting members to said flexural member along a second circumferential zone on said first flexural member in radial opposition to said first circumferential zone; and
   said flexural member operative to transfer synchronous rotary motion between the non-aligned shafts while axially deforming to provide for the non-alignment of the shafts.

2. The coupling as claimed in claim 1 wherein said interconnecting means comprise:
   a second flexural member attached to the free-end of the other of said pair of mounting members along a first circumferential zone; and
   intermediate means connected to said second flexural member along a second circumferential zone in radial opposition to said second flexural first circumferential zone and connected to said first flexural member along said first flexural second circumferential zone.

3. The coupling as claimed in claim 2 wherein said intermediate means comprise:
   at least one intermediate coupling means having at least one end plane non-parallel to the rotational plane of the intermediate coupling means; and
   a plurality of intermediate flexural members attached one at each end, to said intermediate coupling means along a first circumferential zone; and
   said intermediate means interconnecting said first and second flexural members with adjacent flexural members attached to each other at circumferential locations radially opposed to said intermediate flexural member first circumferential zones.

4. The coupling as claimed in claim 2 where said intermediate means comprise:
   an intermediate coupling member having a pair of non-parallel end planes;
   a third flexural member attached to one end of said intermediate coupling member and, at a radially-opposed location, to said first flexural member thereby interconnecting said first flexural member and said intermediate coupling member; and
   said second flexural member is interconnected to said intermediate coupling member along a zone radially-opposed, on said second flexural member, to the location of the zone of attachment of said second flexural member to said mounting member.

5. The coupling as claimed in claim 2 wherein:
   said second flexural member is attached at its periphery to said other mounting member; and
   said means interconnecting said first and second flexural members is comprised of attaching the radially-inward periphery of the first flexural member to the radially-inward periphery of the second flexural member.

6. The coupling as claimed in claim 2 wherein:
   said interconnecting means interconnecting said first and second flexural members is comprised of an intermediate coupling and third and fourth flexural members;

said third and fourth flexural members attached to opposed ends of said intermediate coupling at common circumferential locations;

said third and fourth flexural member attached to said first and second diaphragm members at locations radially-opposed said common circumferential locations; and said opposed circumferential locations being also radially-opposed to the location of the zones of attachment of said first and second flexural members to said mounting members.

7. The coupling as claimed in claim 6 wherein said intermediate coupling member has a pair of non-parallel end planes.

8. A coupling for interconnecting non-coaxially aligned shafts and for synchronizing movement therebetween comprising:

a pair of mounting members, each adapted at one end for attachment to the shafts to be coupled;

at least one intermediate coupling means;

flexural means interconnecting said mounting members and said coupling means; and at least one of said mounting members and said coupling means having an end plane non-parallel to the plane of rotation of the mounting member or coupling means which includes the non-parallel end plane.

References Cited

UNITED STATES PATENTS

| | | | |
|---|---|---|---|
| 539,161 | 5/1895 | Almond | 64—13 XR |
| 1,752,106 | 3/1930 | Persons | 64—13 |

FOREIGN PATENTS 616,929   11/1926   France.

JAMES A. WONG, Primary Examiner

U.S. Cl. X.R.

64—15